US010616761B2

(12) United States Patent
Pothula et al.

(10) Patent No.: US 10,616,761 B2
(45) Date of Patent: Apr. 7, 2020

(54) METHOD, SERVER, BASE STATION AND COMMUNICATION SYSTEM FOR CONFIGURING SECURITY PARAMETERS

(71) Applicant: Huawei Technologies Co., Ltd., Shenzhen (CN)

(72) Inventors: Dharmanandana Reddy Pothula, Bangalore (IN); Chi Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 105 days.

(21) Appl. No.: 15/596,915

(22) Filed: May 16, 2017

(65) Prior Publication Data

US 2017/0251363 A1   Aug. 31, 2017

Related U.S. Application Data

(63) Continuation of application No. PCT/CN2015/079866, filed on May 27, 2015.

(30) Foreign Application Priority Data

Nov. 17, 2014   (IN) ............................ 5782/CHE/2014

(51) Int. Cl.
*H04L 29/06* (2006.01)
*H04W 12/04* (2009.01)
(Continued)

(52) U.S. Cl.
CPC ......... *H04W 12/04* (2013.01); *H04L 63/0272* (2013.01); *H04L 63/061* (2013.01);
(Continued)

(58) Field of Classification Search
CPC ..... H04W 12/04; H04L 63/0272; H04L 29/06
(Continued)

(56) References Cited

U.S. PATENT DOCUMENTS

| 8,024,000 B2 | 9/2011 | Wang et al. |
| 2009/0044280 A1* | 2/2009 | Wu .................. H04L 29/12367 726/26 |

(Continued)

FOREIGN PATENT DOCUMENTS

| CN | 101552984 A | 10/2009 |
| CN | 102655452 A | 9/2012 |

(Continued)

OTHER PUBLICATIONS

3rd Generation Partnership Project; Technical Specification Group Services and System Aspects; "3G security"; Network Domain Security (NDS); IP network layer security (Release 12), 3GPP TS 33.210, V12.2.0, Dec. 2012, 24 pages.
(Continued)

*Primary Examiner* — Evans Desrosiers
(74) *Attorney, Agent, or Firm* — Slater Matsil, LLP (57) ABSTRACT

Methods, servers, base stations and communication systems for configuring security parameters are disclosed. Embodiments of the present invention provide a method for configuring security parameters in a network, the network comprising at least one base station and a server providing service for the at least one base station. The method comprises updating, by the server, security parameters for the base station and sending, by the server, the updated security parameters to the base station, so that base stations transmits data between each other according to the updated security parameters.

19 Claims, 8 Drawing Sheets

(51) Int. Cl.
*H04W 36/00* (2009.01)
*H04W 12/00* (2009.01)

(52) U.S. Cl.
CPC .......... *H04L 63/062* (2013.01); *H04L 63/164* (2013.01); *H04W 12/001* (2019.01); *H04W 36/0038* (2013.01); *H04L 63/065* (2013.01); *H04L 2209/80* (2013.01)

(58) Field of Classification Search
USPC .............................................................. 726/1
See application file for complete search history.

(56) References Cited

U.S. PATENT DOCUMENTS

2011/0105124 A1* 5/2011 Hapsari ................... H04L 9/083
455/436
2015/0135299 A1   5/2015 Liang et al.

FOREIGN PATENT DOCUMENTS

| CN | 102711106 A | 10/2012 | |
|----|---|---|---|
| EP | 2127415 B1 | 6/2014 | |
| EP | 2770778 A2 * | 8/2014 | ............ H04W 12/04 |
| EP | 2770778 A2 | 8/2014 | |
| WO | 2011100892 A1 | 8/2001 | |
| WO | 2012092858 A2 | 7/2012 | |
| WO | 2013062906 A1 | 5/2013 | |
| WO | 2014160763 A1 | 10/2014 | |

OTHER PUBLICATIONS

3rd Generation Partnership Project; Technical Specification Group Services and System Aspects; "Network Domain Security (NDS)"; Authentication Framework (AF) (Release 12), 3GPP TS 33.310, V12.2.0, Sep. 2014, 56 pages.

Kaufman, C., "Internet Key Exchange (IKEv2) Protocol", Network Working Group, Dec. 2005, 99 pages, The Internet Society.

Kent, S., "IP Encapsulating Security Payload", Network Working Group, Dec. 2005, 39 pages, The Internet Society.

Weis, B et al., "The Group Domain of Interpretation", Internet Engineering Task Force (IETF), Oct. 2011, 64 pages, IETF Trust.

Baugher, M et al., "The Group Domain of Interpretation", Network Working Group, Jul. 2003, 48 pages, The Internet Society.

\* cited by examiner

METHOD, SERVER, BASE STATION AND COMMUNICATION SYSTEM FOR CONFIGURING SECURITY PARAMETERS

CROSS-REFERENCE TO RELATED APPLICATIONS

This application is a continuation of International Application No. PCT/CN2015/079866, filed on May 27, 2015, which claims priority to Indian Patent Application No. IN5782/CHE/2014, filed on Nov. 17, 2014. The disclosures of the aforementioned applications are hereby incorporated by reference in their entireties.

TECHNICAL FIELD

The present invention relates to the field of communications, and in particular, to a method, server, base station and communication system for configuring security parameters.

BACKGROUND

In LTE (Long Term Evolution) networks, the X2 is a new type of interface, it connects neighboring eNodeBs (Evolved Node B) in a peer to peer fashion to assist handover and provide a means for rapid co-ordination of radio resources.

LTE introduces new transport networking options with direct inter-base-station connectivity, via the X2 interface, between adjacent eNodeBs for handover. As a result, the deployment of a partial mesh network is beneficial, as traffic does not have to flow through a hub site. Intra E-UTRAN (Evolved Universal Terrestrial Radio Access Network) Handover is used to hand over a UE (User Equipment) from a source eNodeB to a target eNodeB using X2 when the MME is unchanged.

Figure 1:
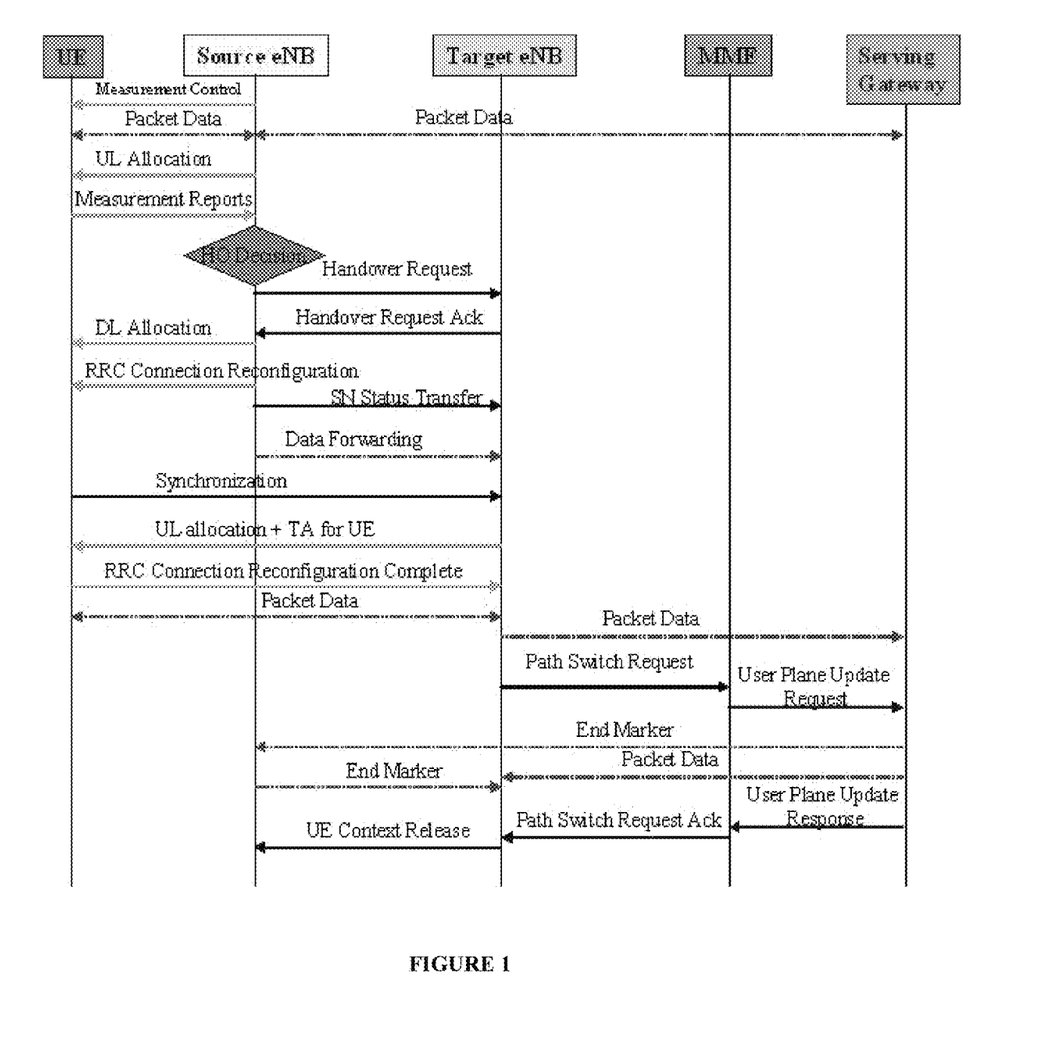
FIG. 1 is a flowchart of how Intra E-UTRAN Handover works.

FIG. 1 is a flowchart of how Intra E-UTRAN Handover works, as shown in FIG. 1, in the scenario described here Serving Gateway is also unchanged. The presence of IP connectivity between the Serving GW and the source eNodeB, as well as between the Serving Gateway and the target eNodeB is assumed. User plane data on the S1-U interface between the target eNodeB and Serving Gateway is not secure, and could be exposed if the transport network is not physically protected.

In many cases, the operator owns their transport network, and additional security is not needed. However, if user traffic were to traverse a third party untrusted network, then it should be protected. In such situations, 3GPP (3rd Generation Partnership Project) specify IPSec (Internet Protocol Security) Encapsulated Security Payload (ESP) in tunnel mode should be used. Unfortunately, this adds further overhead to the user data. The NGMN (Next Generation Mobile Networks) backhaul group assumes IPSec ESP (Encapsulated Security Payload) adds an additional 14% on top of the transport protocol overhead (making 25% in total).

Figure 2:
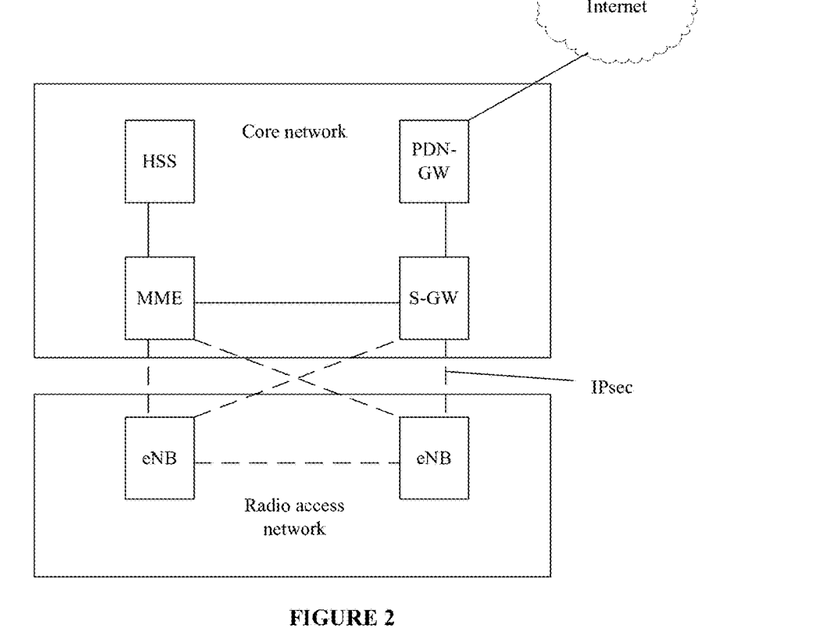
FIG. 2 is a topology diagram of LTE Trusted Model.

FIG. 2 is a topology diagram of LTE Trusted Model. As we know, user plane, control plane and management plane must all be protected by IPSec. The requirement for IPSec tunnel and key management is defined in the 3GPP documents TS 33.210[2] and TS 33.31 which discuss the Layer 3 security and authentication framework. These documents require that IPSec ESP conform to RFC 4303 ("IP Encapsulating Security Payload (ESP)", RFC 4303) to support integrity and replay protection, and that certificate authentication be done by IKEv2 ("Internet Key Exchange (IKEv2) Protocol", RFC 4306). The reasons for security include: eNodeBs access network shall be authenticated, protecting subscriber specific sessions, pass through unauthorized third parties' networks, integrity of user data over S1-U and X2-U, and confidentiality transport. And the IPSec requirements comprise: according to 3GPP, eNodeB should support IPSec tunnel mode, and IPSec transport mode is optional. Moreover, if S1 & X2 transport is trusted, e.g. physical protection, there is no need for IPSec/IKEv2.

Figure 3:
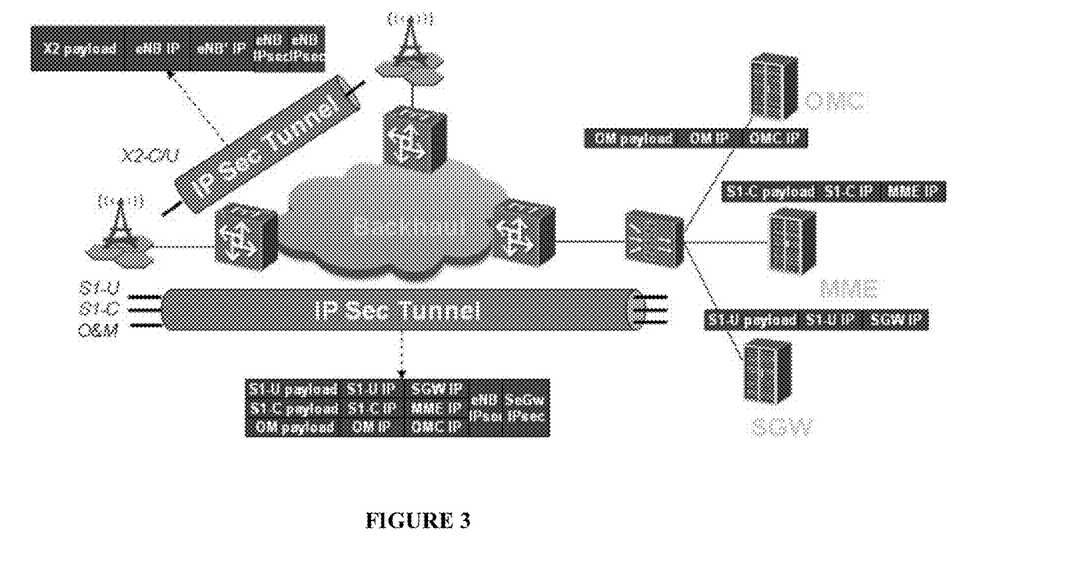
FIG. 3 is a topology diagram of Next Generation Mobile Networks (NGMN)

FIG. 3 is a topology diagram of Next Generation Mobile Networks (NGMN). As per NGMN, it is recommended that each eNodeB supports up to 16 S1 interfaces, and each eNodeB supports up to 32 X2 interfaces. In densely populated areas, deployment needs eNodeB to support up to 32 X2 interfaces.

The number of eNodeBs managed by MME increases gradually, and keys used for eNodeB should be updated dynamically. As a result, performance consumption increases during key negotiation between eNodeB.

SUMMARY

Embodiments of the present invention pertain to a method, server, base station and communication system for configuring security parameters. The objective of the invention is to ensure the security of data transmission, and decrease performance consumption.

According a first aspect of embodiments of the present invention, there is provided a method for configuring security parameters in a network, the network comprising at least one base station and a server providing service for the base station. The method comprises updating, by the server, security parameters for the base station and sending, by the server, the updated security parameters to the base station, so that the at least one base station transmits data between other base stations according to the updated security parameters.

According a second aspect of embodiments of the present invention, there is provided a method for configuring security parameters in a network, the network comprising at least one base station and a server providing service for the base station. The method comprises receiving, by the base station, updated security parameters from the server and transmitting, by the base station, data according to the updated security parameters.

According a third aspect of embodiments of the present invention there is provided a server in a network, the network comprising at least one base station, and the server providing service for the base station. The server comprises an updating unit configured to update security parameters for the at least one base station, and a sending unit configured to send the updated security parameters to the base station, so that the base station transmits data according to the updated security parameters.

According a fourth aspect of embodiments of the present invention there is provided a base station in a network, the network comprising the base station and a server providing service for the base station. The base station comprises a receiving unit configured to receive updated security parameters from the server, and a transmitting unit configured to transmit data according to the updated security parameters.

According a fifth aspect of embodiments of the present invention there is provided a communication system, comprising the server according to the third aspect of embodiments of the present invention, and the base station according to the fourth aspect of embodiments of the present invention.

The advantages of the present disclosure exist in that key negotiation between base stations is not needed, so that the performance consumption can be decreased.

These and further aspects and features of the present disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present disclosure. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. The same element is represented with the same reference number throughout the drawings.

DETAILED DESCRIPTION OF ILLUSTRATIVE EMBODIMENTS

The many features and advantages of the embodiments are apparent from the detailed specification and, thus, it is intended by the appended claims to cover all such features and advantages of the embodiments that fall within the scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

At present, there are some prior arts relate to protect data traffic.

Figure 4:
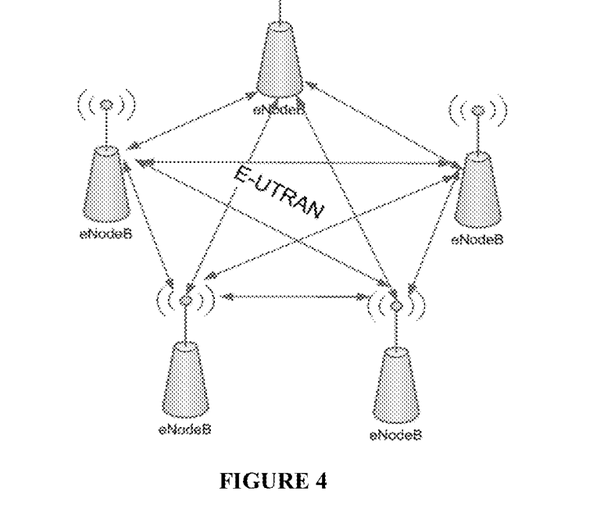
FIG. 4 is a topology diagram of prior art 1.

FIG. 4 is a topology diagram of prior art 1. As shown in FIG. 4, point-to-point tunnels are used for protection of X2/S1 signaling and data traffic. For the X2 interface case, ~64^2 IPSec tunnels needed to create mesh topology.

However, the applicant found that this increases complexity of managing IPSec tunnels, increases operational cost of managing huge number of IPSec tunnels, increases IPSec key negotiation delay and also imposes a substantial drain on system processing resources. It requires approximately 60 MB of memory to create mesh (~64^2) IPSec tunnels for X2, and 100% CPU utilization for 40 to 50 seconds to create full mesh. This repeats on lifetime expiry for rekey. Moreover, it results in X2 interface bandwidth consumption and low IPSec data throughput. Furthermore, it needs Hardware Accelerators to reduce DH (Diffie-Hellman) Key calculation process overhead for full mesh.

Figure 5:
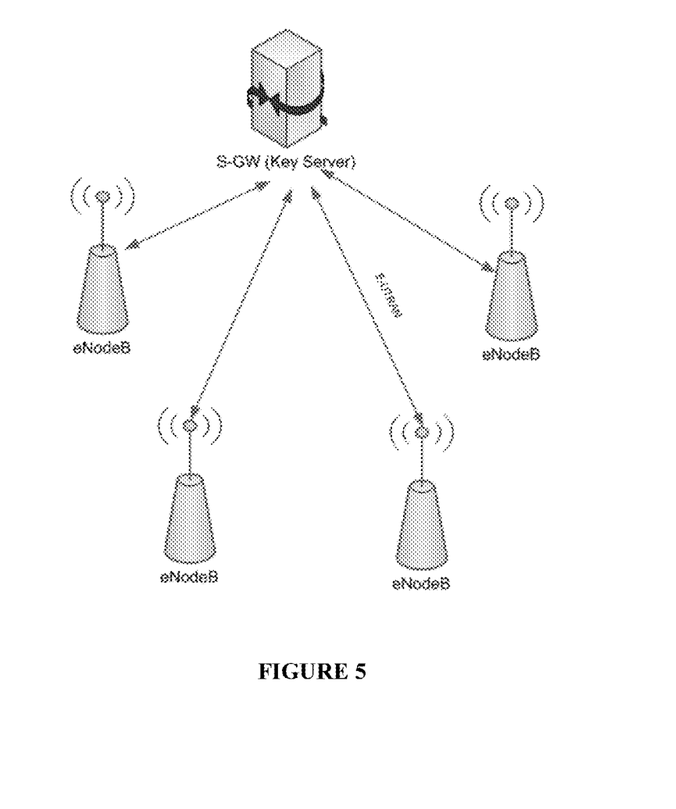
FIG. 5 is a topology diagram of prior art 2.

FIG. 5 is a topology diagram of prior art 2. As shown in FIG. 5, generally leading operators prefer not to create SAs (Security Associations) between eNodeBs but instead route that traffic through an advanced platform's gateway. And at the security gateway, after the IPSec overhead is removed, the service traffic will be dispatched to its corresponding core network node. This simplifies IPSec usage and requires only one pair of SAs from each eNodeB.

However, the applicant found that this approach would introduce additional delay due to two times occurrence of encryption/decryption as encrypted traffic traverses through the serving gateway for eNodeB to eNodeB communication. Twice occurrence of encryption and decryption causes ~20 ms additional delay, which significantly impacts quality of service of delay sensitive applications.

Embodiments of the present invention pertain to a method, server, base station and communication system for configuring security parameters. By setting a server to configure updated security parameters to a group of base stations, key negotiation between base stations is not needed, so that the performance consumption can be decreased.

The preferred embodiments of the present invention are described as follows in reference to the drawings.

Embodiment 1

This embodiment of the present invention provides a method for configuring security parameters in a network.

The network comprises at least one base station and a server provides service for the at least one base station.

Figure 6:
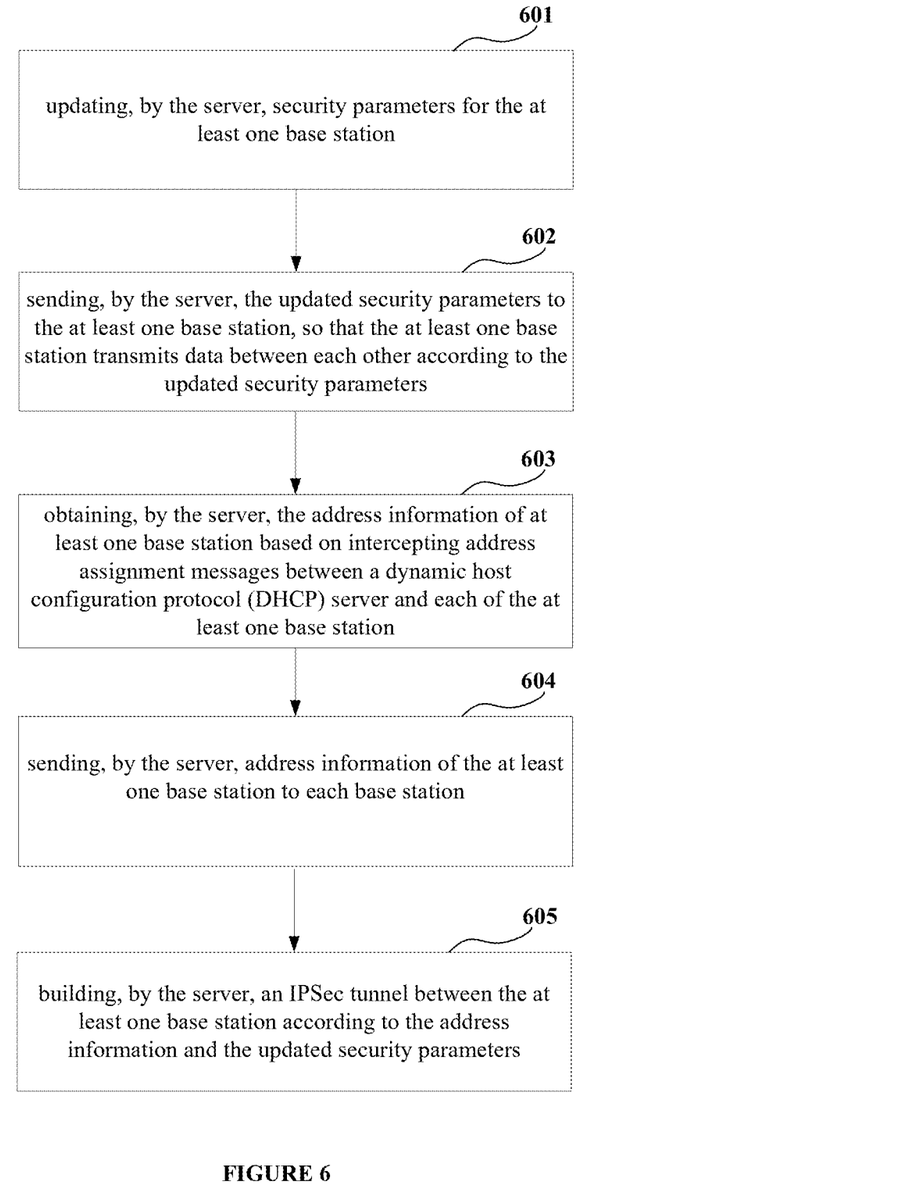
FIG. 6 is a flowchart of the method for configuring security parameters in accordance with an embodiment of the present invention.

FIG. 6 is a flowchart of the method for configuring security parameters in accordance with an embodiment of the present invention. As shown in FIG. 6, the method includes the following steps. In step 601 the server updates security parameters for the at least one base station. In step 602, the server sends the updated security parameters to the at least one base station, so that the base stations transmits data between each other according to the updated security parameters.

It may be understood from the above embodiment that by setting a server to configure updated security parameters to a group of base stations, key negotiation between base stations is not needed, so that the performance consumption can be decreased.

In this embodiment, the server may be a serving gateway (S-GW).

In this embodiment, base stations may be grouped, and the method for grouping can be any one of the existing methods. For example, different IDs may be configured to different groups. Therefore, the base stations in the same group have the same ID and grouping management can be achieved.

In this embodiment, the security parameters may comprise but are not limited to encryption policies and encryption keys, such as a TEK (traffic encryption key) and a KEK (key encryption key), wherein the TEK is used to encrypt data communication, and the KEK is used to encrypt the TEK so that the security of data transmission can be ensured. When configuring the related parameters comprising the TEK and KEK, any one of the existing communication protocol can be used. For example, Group Domain of Interpretation (GDOI) ("The Group Domain of Interpretation", RFC 3547) can be used for grouping management of base stations between the server at the network side and the stations. In the present application, embodiments of the invention are described primarily in the context of the GDOI. However, it shall be appreciated that the invention is not limited to the GDOI.

In this embodiment, the method may further include the following steps. In step 603, obtains the address information of at least one base station based on intercepting address assignment messages between a dynamic host configuration protocol (DHCP) server and each of the at least one base station. In step 604 the server sends address information of the at least one base station to each other base station. In step 605 the server builds an IPSec tunnel between the at least one base station according to the address information and the updated security parameters.

Therefore, the base stations can obtain address information of other base stations, and the base stations can transmit data between each other according to the address information.

Furthermore, only one IPSec tunnel needs to be built, so complexity of system can be decreased.

In this embodiment, the server may update the security parameters by using a multicast key updating method.

It may be understood from the above embodiment that by setting a server to configure updated security parameters to a group of base stations, key negotiation between base stations is not needed, so that the performance consumption can be decreased.

Embodiment 2

This embodiment of the present invention provides a method for configuring security parameters in a network, the network comprises at least one base station and a server providing service for the at least one base station.

Figure 7:
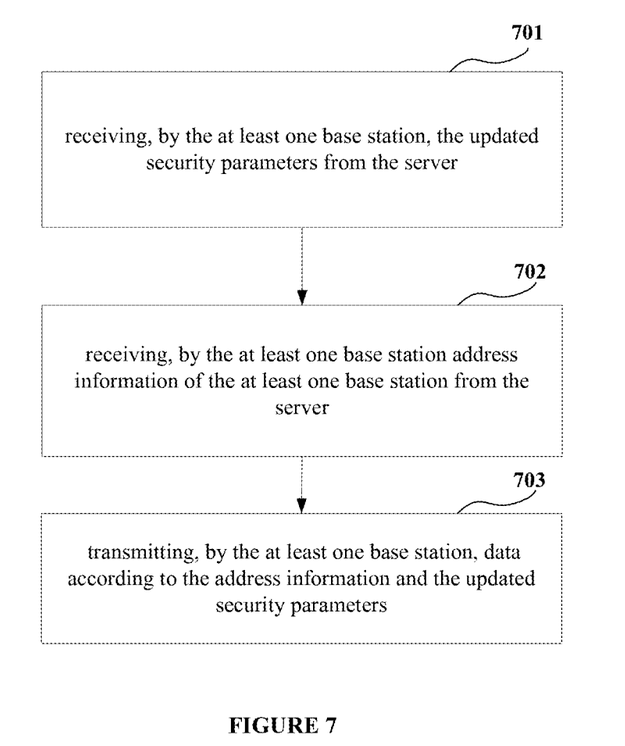
FIG. 7 is a flowchart of the method for configuring security parameters in accordance with an embodiment of the present invention.

FIG. 7 is a flowchart of the method for configuring security parameters in accordance with an embodiment of the present invention. As shown in FIG. 7, the method includes the following steps. In step 701 the at least one base station receives updated security parameters from the server. In step 702 the at least one base station receives address information of another base station from the server. In step 703 the first base station transmits data according to the address information and the updated security parameters.

It may be understood from the above embodiment that by setting a server to configure updated security parameters to a group of base stations, key negotiation between base stations is not needed, so that the performance consumption can be decreased.

Embodiment 3

Following is the example of configuring security parameters between a server at the network side and base stations.

Figure 8:
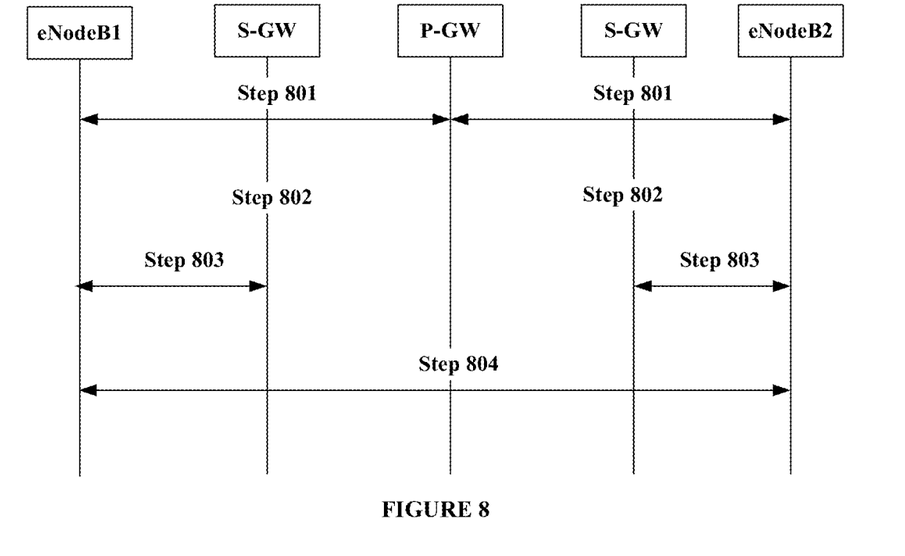
FIG. 8 is a flowchart of the method for configuring security parameters in accordance with an embodiment of the present invention.

FIG. 8 is a flowchart of the method for configuring security parameters in accordance with an embodiment of the present invention, wherein eNodeB1 and eNodeB2 are any two base stations in the same group, and the S-GW is a key server at the network side, and the P-GW is the DHCP server at the network side. As shown in FIG. 8, the method includes the following steps. In step 801, eNodeB1 or eNodeB2 and the DHCP server exchange information. In step 802 the S-GW obtains the access control list policy based on intercepting address assignment between a dynamic host configuration protocol (DHCP) server and the grouped base stations. In step 803 eNodeB1 or eNodeB2 and the S-GW exchange information, so the related parameters comprising the TEK, KEK and the access control list policy can be configured to eNodeB1 and eNodeB2. In step 804 eNodeB1 and eNodeB2 transmit data between each other on the basis of the related parameters.

It may be understood from the above embodiment that: by dividing base stations into groups, and configuring the same parameters to the base stations of the same group, the security of data transmission can be ensured, and data volume and operational cost can be decreased.

In addition, the base stations may obtain the access control list of other base stations in the same group, so it can determine the interesting data transmission.

Figure 9:
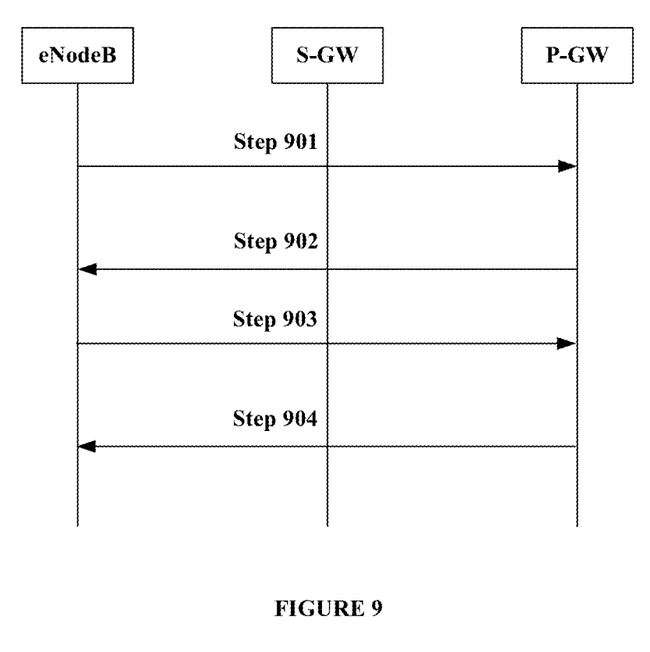
FIG. 9 is a flowchart of the method for exchanging DHCP message in accordance with an embodiment of the present invention.

In the step 801 of this embodiment, the method for exchanging information between eNodeB1 or eNodeB2 and the DHCP server can use any one of the existing methods. For example, FIG. 9 is a flowchart of the method for exchanging DHCP message in accordance with an embodiment of the present invention, wherein the PDN Gateway is the DHCP server. As shown in FIG. 9, the method includes the following steps. In step 901 the eNodeB sends a DHCP Discover message to obtain valid IPv4 address configuration. In step 902 the PDN Gateway receives the DHCPDiscover message and sends a DHCPOffer message back to the eNodeB. In step 903 the eNodeB selects an IPv4 address configuration from the DHCP Offer message and sends a DHCP Request message. In step 904 the PDN Gateway assigns the IPv4 address configuration to the eNodeB and sends a DHCP Acknowledgment message to the eNodeB.

In the above exchanging process, the acknowledgment message comprises information of address assignment.

Therefore, the base stations can obtain the access control list of other base stations in the same group, and it can determine the interesting data transmission.

Figure 10:
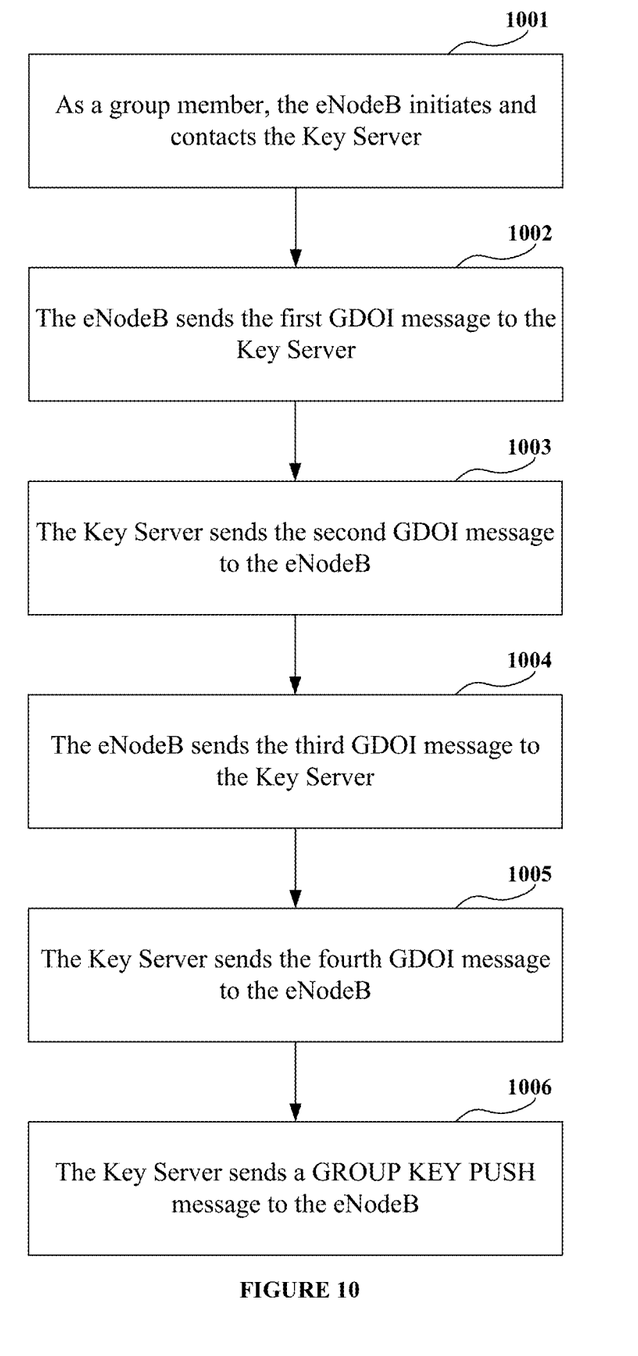
FIG. 10 is a flowchart of the method for exchanging information between the key server and base stations in accordance with an embodiment of the present invention.

In the step 803 of this embodiment, GDOI may be used for grouping management of base stations. Figure to is a flowchart of the method for exchanging information between the key server and base stations in accordance with an embodiment of the present invention. As shown in Figure to, the method includes the following steps. In step 1001 as a group member, the eNodeB initiates and contacts the Key Server. In this step, the GM is configured with the group identifier and acceptable Phase 1 policy. Once Phase 1 is complete, the initiator moves to GDOI protocol. In step 1002 the eNodeB sends the first GDOI message to the Key Server. In this step, the eNodeB builds a NONCE payload by choosing the Ni (Nonce value by initiator), builds an ID payload using the group identifier, and generates HASH(1). The first GDOI message is also called Request message. In step 1003 the Key Server sends the second GDOI message to the eNodeB. In this step, the Key Server (Responder) processes the NONCE and ID payloads. It verifies that its database contains the group information for the group ID. It constructs the second GDOI message, chooses the Nr (Nonce value by responder) for NONCE payload, the policy for the group in the ID payload, followed by SA TEK payload for traffic SAs and SA KEK payload, and generates HASH(2). The second GDOI message is also called Push message. In step 1004 the eNodeB sends the third GDOI message to the Key Server. In this step, the eNodeB validates the HASH (2) and process NONCE and SA payloads. If the group policy uses Certificates for authorization, the GM generates a hash with Ni and Nr, and signs it. This becomes the POP payload. The CERT payload holds the Public Key. The GM creates the third GDOI message using POP and CERT payloads, and generates HASH (3). The third GDOI messages is also called ACK message. In step 1005 the Key Server sends the fourth GDOI message to the eNodeB. In this step, the Key Server validates the hash. It constructs a fourth GDOI message including the SEQ payload containing the sequence number, the KD payload containing keys corresponding to policy previously sent in SA TEK and KEK, and POP and CERT payloads (if needed), and generates HASH (4). The fourth GDOI message is also called Key Download message. In step 1006 the Key Server sends a GROUP KEY PUSH message to the eNodeB. In this step, The GROUP KEY PUSH message replaces a Re-key SA &/or Data-security SA, and it can be pushed using unicast or multicast. It is only a single message generated by the Key Server. It may include new keys when the key-lifetime is about to finish, dynamic access-list policy is about to identify the interesting traffic. This ACL policy will be downloaded to all eNodeB's for this Key server.

It may be understood from the above embodiment that by setting a server to configure updated security parameters to a group of base stations, key negotiation between base stations is not needed, so that the performance consumption can be decreased.

Embodiment 4

This embodiment of the present invention further provides a server in a network, the network comprises at least one base station and a server provides service for the at least one base station. This embodiment corresponds to the method of the above embodiment 1, and the same content will not be described.

Figure 11:
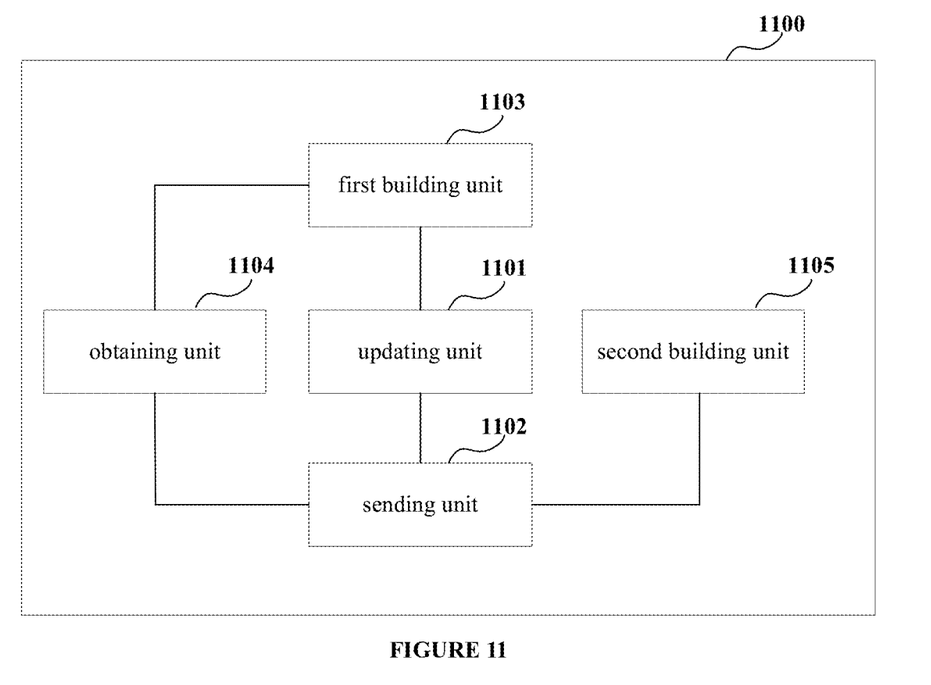
FIG. 11 is a schematic diagram of the server in accordance with an embodiment of the present invention.

FIG. 11 is a schematic diagram of the server in accordance with an embodiment of the present invention. As shown in FIG. 11, the server 1100 includes an updating unit 1101, configured to update security parameters for the at least one base station and a sending unit 1102, configured to send the updated security parameters to the at least one base station, so that the at least one base station transmits data according to the updated security parameters.

In this embodiment, the sending unit 1102 is further configured to send address information of the at least one base station to each base station. In this embodiment, the network apparatus can further include a first building unit 1103, configured to build an IPSec tunnel between the at least one base station according to the address information and the updated security parameters. In this embodiment, the server can further include an obtaining unit 1104, configured to obtain the address information of at least one base station based on intercepting address assignment messages between a dynamic host configuration protocol (DHCP) server and each of the at least one base station.

In this embodiment, the server can further include a second building unit 1105, configured to build IKE tunnels between the server and each of the at least one base station through GDOI protocol, and wherein the sending unit sends the updated security parameters to the at least one base station through the IKE tunnels.

It may be understood from the above embodiment that by setting a server to configure updated security parameters to a group of base stations, key negotiation between base stations is not needed, so that the performance consumption can be decreased.

Embodiment 5

This embodiment of the present invention further provides a base station in a network, the network comprises at least one base station and a server provides service for the at least one base station. This embodiment corresponds to the method of the above embodiment 2, and the same content will not be described.

Figure 12:
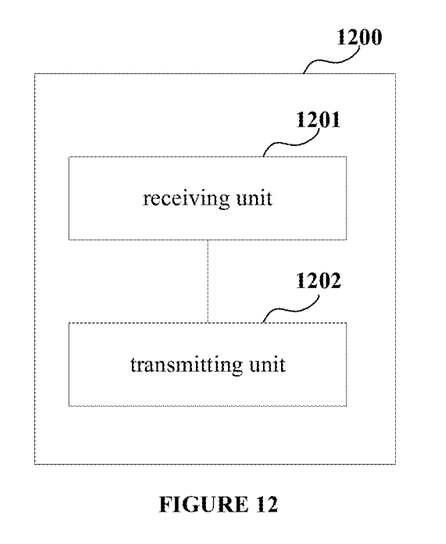
FIG. 12 is a schematic diagram of the base station in accordance with an embodiment of the present invention.

FIG. 12 is a schematic diagram of the network apparatus in accordance with an embodiment of the present invention. As shown in FIG. 12, the base station 1200 includes a receiving unit 1201, configured to receive updated security parameters from the server and a transmitting unit 1202, configured to transmit data according to the updated security parameters. In this embodiment, the receiving unit 1201 may be further configured to receive address information of the at least one base station from the server, and the transmitting unit 1202 transmits data according to the address information and the updated security parameters.

It may be understood from the above embodiment that by setting a server to configure updated security parameters to a group of base stations, key negotiation between base stations is not needed, so that the performance consumption can be decreased.

Embodiment 6

This embodiment of the present invention further provides a communication system. The communication system includes the server according to the embodiment 4 of the present invention and the base station according to the embodiment 5 of the present invention, and the same content will not be described.

The description or blocks in the flowcharts or of any process or method in other manners may be understood as being indicative of comprising one or more modules, segments or parts for realizing the codes of executable instructions of the steps in specific logic functions or processes, and that the scope of the preferred embodiments of the present invention comprise other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus.

The above literal description and drawings show various features of the present invention. It should be understood that those skilled in the art may prepare appropriate computer codes to carry out each of the steps and processes as described above and shown in the drawings. It should be also understood that all the terminals, computers, servers, and networks may be any type, and the computer codes may be prepared according to the disclosure to carry out the present invention by using the apparatus.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

What is claimed is:

1. A method, comprising:
    updating, by a server, a security parameter for a plurality of base stations to obtain an updated security parameter, wherein the server provides service for the plurality of base stations;
    obtaining, by the server, address information of a second base station of the plurality of base stations by intercepting at least one address assignment message sent from a configuration server to the second base station;
    sending, by the server, address information of a first base station to the second base station; and
    building, by the server, an Internet Protocol Security (IPSec) tunnel between a first base station of the plurality of base stations and the second base station according to the address information and the updated security parameter; and
    sending, by the server, the updated security parameter to the plurality of base stations, and sending the address information to at least the first base station so that the first base station transmits data according to the updated security parameter and the address information, wherein the data is transmitted between the first base station and the second base station without negotiation between the first base station and the second base station.

2. The method as claimed in claim 1, wherein the configuration server is a dynamic host configuration protocol (DHCP) server, and wherein the at least one address assignment message comprises a DHCP Acknowledgment message.

3. The method as claimed in claim 2, wherein the configuration server is a dynamic host configuration protocol (DHCP) server, and wherein the DHCP acknowledgement message is sent in response to a DHCP Request message sent from the second base station to the DHCP server.

4. The method as claimed in claim 1, further comprising:
    building, by the server, Internet Key Exchange (IKE) tunnels between the server and each of the plurality of base stations through Group Domain of Interpretation (GDOI) protocol; and
    sending the updated security parameter to the first base station through the IKE tunnels.

5. The method as claimed in claim 1, wherein the security parameter comprises an access control list policy and at least one of encryption policies or encryption keys.

6. The method as claimed in claim 1, wherein the server updates the security parameter using a multicast key updating method.

7. The method as claimed in claim 1, further comprising sending, by the server, the updated security parameter to the second base station, wherein the updated security parameter comprises a traffic encryption key and a key encryption key.

8. A method, comprising:
    receiving, by a first base station in a plurality of base stations, from a server, an updated security parameter and address information of a second base station, wherein the address information is obtained by the server by intercepting at least one address assignment message sent from a configuration server to the second base station; and
    transmitting, by the first base station to the second base station, over an Internet Protocol Security (IPSec) tunnel built by the server between the first base station and the second base station according to the address information and the updated security parameter, data according to the updated security parameter and the address information without negotiation between the first base station and the second base station.

9. The method as claimed in claim 8, wherein the configuration server is a dynamic host configuration protocol (DHCP)server, and wherein the at least one address assignment message comprises a DHCP Acknowledgment message.

10. A server, comprising:
    a transmitter;
    a processor;
    a non-transitory computer-readable storage medium storing a program to be executed by the processor, the program including instructions for:

updating a security parameter for a plurality of base stations to obtain an updated security parameter;

obtaining address information of a second base station of the plurality of base stations by intercepting at least one address assignment message sent from a configuration server to the second base station; and causing the transmitter to send the updated security parameter and the address information to a first base station of the plurality of base stations; and building an Internet Protocol Security (IPSec) tunnel between the first base station and the second base station according to the address information and the updated security parameter;

wherein sensing the address information and building the IPSec tunnel results in the first base station transmitting data to the second base station in the plurality of base stations according to the updated security parameter and the address information without negotiation between the first base station and the second base station.

11. The server as claimed in claim 10, wherein the program further includes instructions to:

wherein the server further comprises:

a second processor; and a second non-transitory computer-readable storage medium storing a program to be executed by the second processor, the program including instructions for building the IPSec tunnel between the first base station and the second base station according to the address information and the updated security parameter.

12. The server as claimed in claim 10, wherein the configuration server is a dynamic host configuration protocol (DHCP) server), and wherein the at least one address assignment message comprises a DHCP Acknowledgment message.

13. The server as claimed in claim 10, wherein the server further comprises:

a second processor; and a second non-transitory computer-readable storage medium storing a program to be executed by the second processor, the program including instructions for building Internet Key Exchange (IKE) tunnels between the server and each of the plurality of base stations through Group Domain of Interpretation (GDOI) protocol, wherein the transmitter sends the updated security parameter to the first base station through the IKE tunnels.

14. The server as claimed in claim 10, wherein the security parameter comprises an access control list policy and at least one of encryption policies or encryption keys.

15. The server as claimed in claim 10, wherein the processor updates the security parameter using a multicast key updating method.

16. The server as claimed in claim 10, wherein the program further includes instructions to cause the transmitter to send the updated security parameter to the second base station, and wherein the updated security parameter comprises a traffic encryption key and a key encryption key.

17. A base station, comprising:

a transmitter;

a receiver;

a processor; and a non-transitory computer-readable storage medium storing a program to be executed by the processor, the program including instructions to:

receive, through the receiver, from a server, an updated security parameter and address information of a target base station, wherein the server provides service for the base station, and wherein the address information is obtained by the server by intercepting at least one address assignment message sent from a configuration server to the target base station; and cause the transmitter to transmit data to the target base station according to the updated security parameter and the address information over an Internet Protocol Security (IPSec) tunnel built by the server between the base station and the target base station according to the address information and the updated security parameter, wherein transmitting the data to the target base station is performed without negotiation between the base station and the target base station.

18. The base station as claimed in claim 17, wherein the updated security parameter comprises a traffic encryption key and a key encryption key.

19. The base station as claimed in claim 17, wherein the configuration server is a dynamic host configuration protocol (DHCP)server, and wherein the at least one address assignment message comprises a DHCP Acknowledgment message.

* * * * *